2,950,197
HARDENING OF GELATIN

Charles F. H. Allen, Rochester, N.Y., and Eleanor R. Webster, Wellesley, Mass., assignors to Eastman Kodak Company, Rochester, N.Y., a corporation of New Jersey No Drawing. Filed July 25, 1956, Ser. No. 599,891

10 Claims. (Cl. 96—111)

This invention relates to the hardening of gelatin to enhance its resistance to water by incorporating therein compounds containing at least 2 aziridine groups therein.

In the use of gelatin particularly for photographic purposes the gelatin is often treated with a succession of aqueous baths which vary in pH or which have raised temperatures. There has been a great deal of work done on the treatment of gelatin to improve its resistance to water so that swelling and melting of the gelatin does not occur upon treatment thereof with aqueous solutions in processing operations or in hot drying. The compounds which have heretofore been found useful for the treatment of gelatin so as to prevent the swelling or melting thereof under processing conditions fall under 4 or possibly 3 classes as follows:

(1) Metallic salts such as those of chromium, aluminum and zirconium;
(2) Aldehydes such as formaldehyde or mucochloric acid;
(3) 1,2-; 1,4-diketones;
(4) Quinones which possibly might be considered as diketones.

These hardeners, however, have in many instances exhibited unwanted photographic effects of one kind or another. For instance, hardeners of the aldehyde type sometimes show a tendency to cause an increase in fogging of the emulsion when employed for hardening therein. Other types of hardeners have a tendency to cause loss of speed of the emulsion upon storage of the same. It is desirable that hardeners for gelatin when used in photographic emulsions will not adversely effect the photographic characteristics of the emulsion.

One object of our invention is to provide hardeners for gelatin which exhibit no known detrimental photographic effects. Another object of our invention is to provide materials which when mixed with gelatin will render the same resistant to the effects of water of varying pH or at elevated temperatures. A further object of our invention is to provide for the hardening of gelatin by the use of compounds having at least 2 aziridine groups. Other objects of our invention will appear herein.

We have found that gelatin is rendered resistant to the effects of water even at elevated temperature by incorporating therein a compound having at least 2 aziridine groups, each of which is linked through its ring nitrogen directly to a carbonyl group. Type formulas for compounds useful for our purposes are the following:

(I) 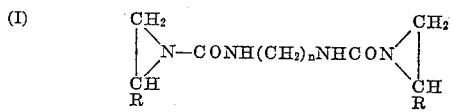

(II) 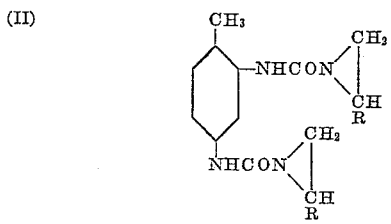

(III) 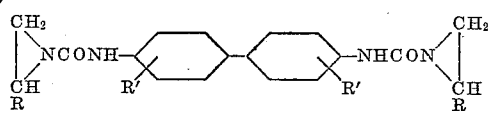

(IV) 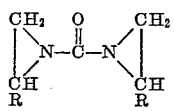

(V) 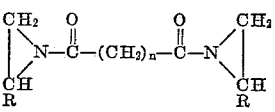

(VI) 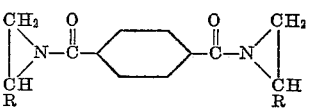

(VII) 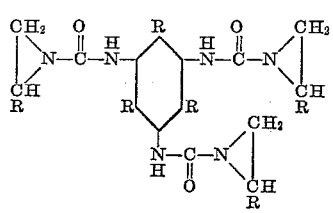

(VIII) 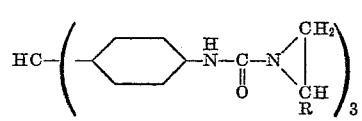

in which formulas R is H or $CH_3$, R' is hydrogen, alkyl or alkoxy and $n$ is a number from 2 to 10.

Our invention is conveniently carried out by mixing gelatin with one or more hardeners corresponding to the above formulas. The preparation of compounds of type Formulas I, II and III is described in U.S. Patents Nos. 2,390,165 of Orthner et al. and 2,327,760 of Bestian. Compounds of type Formula IV are conveniently prepared by reacting ethylene imine with phosgene, those of type Formulas V and VI by reacting ethylene imine with a chloride of a dicarboxylic acid as, for example, succinyl chloride or terephthalyl chloride and those of type Formula VII by reacting ethylene imine with a triisocyanate, for example, mesitylene-2,4,6-triisocyanate (Ann. vol. 562, page 75).

In using these hardeners in aqueous gelatin compositions it is ordinarily desirable that they first be dissolved in water or an inert solvent and added to the gelatin composition in the form of their solution. If a photographic emulsion is being hardened the solvent used for incorporating the hardener should be one that has no detrimental effect thereon.

The compounds which we have found useful as hardeners for gelatin applied as a coating from its aqueous solution are those which have at least 2 aziridine groups therein, each of which is directly joined to a carbonyl group. Although some hardening effect is obtained when the aziridine compound is used in the gelatin coating composition in an amount of less than 0.1 part per 100 parts of gelatin, it is ordinarily desirable to employ at least 0.1 part of the aziridine compound (per 100 parts of gelatin) to get substantial hardening. Various proportions of hardening agents in accordance with our invention have been used such as 0.1 part, α 1¼ parts, α 5 parts, α 10 parts up to α 25 parts or more per 100 parts of gelatin (α=approximately) and effective hardening of the gelatin layers has resulted. The hardeners described herein are especially useful for use in gelatin-silver halide photographic emulsions.

The following examples illustrate our invention:

*Example 1*

Positive speed gelatin-silver chlorobromide photographic emulsions containing the amount and kinds of hardener as specifically indicated in the following table were coated on a cellulose acetate film base. The coatings were exposed for one second on an Eastman 1B Sensitometer and processed for 4 minutes in Developer D-19. The results obtained were as follows:

| Compound | Gm. of the Hardener/ 100 gm. dry Gelatin | Fresh Tests | | | 1 wk., 120° F. | | | Melting Point in Warm Water, degrees |
|---|---|---|---|---|---|---|---|---|
| | | Speed | $\gamma$ | Fog | Speed | $\gamma$ | Fog | |
| Control | | 1.44 | 6.40 | .04 | 3.6 | 5.80 | .15 | 93 |
| N,N'-Trimethylene bis (1-aziridine-carboxamide) | 1.265 | 1.50 | 6.90 | .04 | 3.2 | 5.30 | .18 | >212 |
| N,N'-Octamethylene bis (1-aziridine-carboxamide) | 1.265 | 1.50 | 6.80 | .05 | 2.95 | 5.40 | .22 | >212 |
| Toluene-2,4-bis (1-aziridine-carboxamide) | 1.265 | 1.17 | 6.70 | .04 | 2.45 | 6.10 | .20 | >212 |

*Example 2*

A gelatin-silver chlorobromide emulsion was employed using different amounts of N,N'-tetramethylene bis (1-aziridine-carboxamide) and the procedure described in the preceding example was followed. The results which were obtained were as follows:

| Compound | Gm. of the Hardener/ 100 gm. dry Gelatin | Fresh Tests | | | 1 wk., 120° F. | | | Melting Point in Warm Water, degrees |
|---|---|---|---|---|---|---|---|---|
| | | Speed | $\gamma$ | Fog | Speed | $\gamma$ | Fog | |
| Control | | 1.54 | 1.54 | .05 | 5.0 | 5.30 | .21 | 99 |
| N,N'-tetramethylene bis (1-aziridine-carboxamide) | 0.314 | 1.65 | 6.50 | .05 | 4.55 | 5.30 | .19 | 109 |
| Do | 0.628 | 1.80 | 6.40 | .05 | 4.65 | 5.30 | .21 | 179 |
| Do | 1.265 | 1.77 | 6.50 | .05 | 4.25 | 5.50 | .33 | 212 |

*Example 3*

Hardener was incorporated in negative speed gelatin-silver bromoiodide emulsion as indicated in the following table and the emulsion was coated on a cellulose acetate film base. The coatings were exposed on an Eastman 1B Sensitometer for 1/25 of a second and processed for 5 minutes in developer DK-50. The results obtained are as follows:

| Compound | Gm. of the Hardener/ 100 gm. dry Gelatin | Fresh Tests | | | 1 wk., 120° F. | | | Melting Point in Warm Water, degrees |
|---|---|---|---|---|---|---|---|---|
| | | Speed | $\gamma$ | Fog | Speed | $\gamma$ | Fog | |
| Control | | 5,850 | 1.02 | .18 | 5,000 | 0.91 | .20 | 90 |
| N,N'-tetramethylene bis (1-aziridine-carboxamide) | 1.135 | 5,700 | 0.85 | .15 | 2,600 | 0.65 | .18 | 212° at 2 min.+ |
| Toluene-2,4-bis (1-aziridine-carboxamide) | 0.852 | 4,550 | 0.84 | .16 | 1,730 | 0.70 | .36 | Do. |

*Example 4*

Coatings were made of gelatin-silver chloride unwashed photographic emulsion containing 267 g. of gelatin per mole of silver chloride. The amount of hardener added in each case and the melting points of the resulting coatings were as follows:

| Hardener | Concentration | Melting Point, °F. |
|---|---|---|
| formaldehyde | .36 g. per mole of silver chloride | 224 |
| diethylene urea | 6 g. per mole of silver chloride (about 2.25 parts per 100 gelatin) | 257 |
| Do | 12 g. per mole of silver chloride (about 4.5 parts per 100 gelatin) | >300 |
| Do | 24 g. per mole of silver chloride (about 9 parts per 100 gelatin) | >300 |

Neither the fresh nor the incubated coatings containing diethylene urea showed any adverse photographic effects.

*Example 5*

Coatings were made from washed silver bromide emulsion containing 236 g. of gelatin per mole of silver halide. The amount of hardener added and the melting point of the coating in each case was as follows:

| Hardener | Concentration | Melting Point, °F. |
|---|---|---|
| formaldehyde | .78 g. per mole of silver halide | 2 |
| diethylene urea | 24 g. per mole of silver halide | 2 |

Neither the fresh nor the incubated coatings containing diethylene urea showed any adverse photographic effects.

*Example 6*

Diethylene urea was compared with mucochloric acid as a hardener in color photographic emulsions containing incorporated couplers. Whereas the coatings containing mucochloric acid showed reticulation at 93° F., those containing diethylene urea showed no reticulation up to 212° F. The melting points of the coatings containing diethylene urea were above 212° F. whereas the coatings containing mucochloric acid melted at about 191° F. Coatings with various concentrations of diethylene urea such as 1, 2, 4 and 8 gms. thereof per lb. of gelatin processed well in photographic processing operations.

*Example 7*

Coatings were made from a negative speed gelatin-silver chlorobromide photographic emulsion containing 1.13 parts of 1,4-bis (aziridine-1-carbonyl) piperazine per 100 parts of gelatin. The melting point of the coating thus obtained was 212° F. after more than two minutes. The melting point of coatings of this emulsion without the hardener therein was 84° F.

*Example 8*

Coatings were made from a positive speed gelatin-silver chlorobromide photographic emulsion in which had been incorporated 1.14 parts of mesitylene-2,4,6-tris(3,3-ethylene urea) per 100 parts of gelatin. The coating thus obtained was tested for melting point and was found to have a melting point of 212° F. after more than 2 minutes. The melting point of a coating of the same emulsion without hardening agent was 84° F.

The emulsions in which hardeners are incorporated in accordance with our invention may be coated out onto any type of support such as cellulose ester film base, paper, fabric, glass, etc., to form photographic products. The emulsions in accordance with our invention will cling to the support therefor until a temperature is reached (when the emulsion is immersed in water) that the emulsion itself melts and thereby separates from the emulsion support. The emulsion in accordance with our invention may be sensitized or otherwise treated in its manufacture as is conventional for gelatin-silver halide photographic emulsions. The testing of the melting point of the gelatin coatings is carried out by immersing the coated film base in water the temperature of which is then increased until a point is reached where melting of the gelatin occurs.

The hardeners which we have described are useful in various kinds of gelatin photographic emulsions. In addition to being useful in nonoptically sensitized emulsions, they may also be useful in orthochromatic, panchromatic and X-ray emulsions. They may be added to the emulsion before or after any sensitizing dyes or other sensitizers which are used. Various silver salts may be used as the sensitive salt such as silver bromide, silver iodide, silver chloride or mixed silver halides such as silver chlorobromide or silver bromoiodide. The hardening agents in accordance with our invention may be used in gelatin emulsions intended for color photography; for example, emulsions containing color-forming couplers or emulsion to be developed by solutions containing couplers.

The following examples illustrate methods by which some hardeners for use in compositions in accordance with our invention may be prepared:

*Example 9.—Diethylene urea*

[See article by Bestian et al., Ann., 566, 210–244.]

A solution of 38 parts of phosgene in 115 parts of dry benzene was added slowly during 50 minutes to a solution of 33 parts of ethylene imine and 81 parts of triethylamine in 257 parts of benzene, held at a temperature of less than 10° C. The mass was then stirred for 1½ hours, filtered, the benzene was evaporated and the residual oil was vacuum distilled to give 26.6 parts of a colorless oil which solidified. The diethylene urea had a melting point of 39–41° C.

*Example 10.—N,N'-bisethylene succinamide*

To a solution consisting of 17.6 parts of ethylene imine and 40.4 parts of triethylamine in 200 parts of benzene, a solution of 31 parts of succinyl chloride was slowly added with stirring, the temperature being held below 10° C. After a few hours at 0° C., the mass was filtered and the filtrate was treated with decolorizing carbon. The benzene was evaporated off at reduced pressure and the product was obtained as an oil which crystallized from ether solution. The bisaziridine compound obtained was water soluble.

*Example 11*

A solution of 31.2 grams of powdered dry N,N'-bis (chlorocarbonyl)piperazine in 325 parts of methylene chloride was slowly added to a solution of 17 parts of ethylene imine and 44.3 parts of triethylamine in 120 parts of ether, the temperature being held to less than 12° C. The mixture was allowed to warm to 25° C. during 16 hours and was filtered. The filtrate was evaporated and extracted with acetone. There was obtained from the extract crude colorless crystals of 1,4-bis(aziridine-1-carbonyl) piperazine. Recrystallization from benzene and then from acetone gave the pure compound having a melting point of 138–139.5° C.

This application is a continuation-in-part of our application Serial No. 502,208, filed April 18, 1955.

We claim:

1. A process for preparing photographic products which comprises incorporating in a gelatin-silver halide photographic emulsion from 0.1 to about 1.265%, based on the weight of the gelatin, of a compound containing at least two aziridine groups, the ring nitrogens of which are linked directly to carbonyl and coating the photographic emulsion in the form of a layer upon a support therefor.

2. A gelatin-silver hailde photographic emulsion containing 0.1 to about 1.265%, based on the weight of the gelatin, of a compound containing at least two aziridine groups, the ring nitrogens of which are linked directly to carbonyl.

3. A gelatin-silver halide photographic emulsion containing 0.1 to about 1.265%, based on the weight of the gelatin, of a compound having the formula:

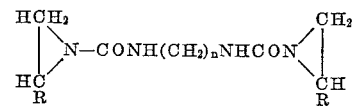

wherein $n$ is a number from 2 to 10 and each R is selected from the group consisting of $CH_3$ and H.

4. A gelatin-silver halide photographic emulsion containing 0.1 to about 1.265%, based on the weight of the gelatin, of a compound having the formula:

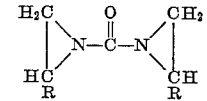

each R being selected from the group consisting of H and $CH_3$.

5. A gelatin-silver halide photographic emulsion containing 0.1 to about 1.265%, based on the weight of the gelatin, of a compound having the formula:

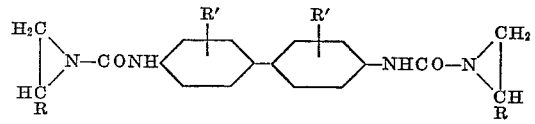

each R being selected from the group consisting of H and $CH_3$ and each R' being selected from the group consisting of hydrogen, alkyl and alkoxy.

6. A gelatin-silver halide photographic emulsion containing 0.1 to about 1.265%, based on the weight of the gelatin, of N,N' trimethylene bis (1-aziridine carboxamide).

7. A gelatin-silver halide photographic emulsion containing 0.1 to about 1.265%, based on the weight of the gelatin, of toluene 2,4 bis (1-aziridine carboxamide).

8. A gelatin-silver halide photographic emulsion containing 0.1 to about 1.265%, based on the weight of the gelatin, of 1,4 bis(aziridine-1-carbonyl) piperazine.

9. A gelatin-silver halide photographic emulsion containing 0.1 to 1.265%, based on the weight of the gelatin, of N,N' diethylene urea.

10. A gelatin-silver halide photographic emulsion containing 0.1 to about 1.265%, based on the weight of the gelatin, of mesitylene-2,4,6-tris (3,3 ethylene urea).

References Cited in the file of this patent

UNITED STATES PATENTS

| | | |
|---|---|---|
| 1,429,586 | Hanna | Sept. 19, 1922 |
| 2,354,662 | Bryce | Aug. 1, 1944 |
| 2,360,192 | Bestian et al. | Oct. 10, 1944 |
| 2,553,506 | Mueller et al. | May 15, 1951 |
| 2,586,168 | Kaszuba | Feb. 19, 1952 |
| 2,629,659 | Mueller | Feb. 24, 1953 |
| 2,726,162 | Allen | Dec. 6, 1955 |

FOREIGN PATENTS

| | | |
|---|---|---|
| 899,955 | Germany | Sept. 11, 1944 |

OTHER REFERENCES

Sheppard: "Gelatin in Photography," vol. 1, Monograph #3, page 25, Eastman Kodak Co., Rochester, N.Y. (1923).

UNITED STATES PATENT OFFICE

CERTIFICATE OF CORRECTION

Patent No. 2,950,197　　　　　　　　　　　　August 23, 1960

Charles F. H. Allen et al.

It is hereby certified that error appears in the printed specification of the above numbered patent requiring correction and that the said Letters Patent should read as corrected below.

Column 4, lines 56 and 57, in the table, third column thereof, under the heading "Melting Point, °F.", line 1, for "2" read -- 226 --; line 2, for "2" read -- 280 --; column 6, line 37, for "hailde" read -- halide --.

Signed and sealed this 11th day of April 1961.

(SEAL)
Attest:
ERNEST W. SWIDER

Attesting Officer

ARTHUR W. CROCKER
Acting Commissioner of Patents